United States Patent [19]

Piringer et al.

[11] Patent Number: 4,647,063
[45] Date of Patent: Mar. 3, 1987

[54] LIGHTWEIGHT CORE FOR LAMINATE CONSTRUCTIONS

[75] Inventors: Robert Piringer, Ried im Innkreis; Walter A. Stephen, Braunau, both of Austria

[73] Assignee: Fischer Gesellschaft m.b.H., Ried im Innkreis, Austria

[21] Appl. No.: 553,401

[22] Filed: Nov. 18, 1983

[30] Foreign Application Priority Data

Nov. 22, 1982 [AT] Austria ................................ 4241/82

[51] Int. Cl.$^4$ ............................................. A63C 5/00
[52] U.S. Cl. .................... 280/610; 428/184; 428/186
[58] Field of Search ............... 428/186, 477.4, 184; 280/601, 602, 609, 610

[56] References Cited

U.S. PATENT DOCUMENTS

| 1,955,833 | 4/1934 | Romanoff ...................... 428/186 X |
| 3,132,874 | 5/1964 | Baudou .................................. 280/610 |
| 3,259,670 | 7/1966 | Weltman et al. ............. 428/477.4 X |
| 3,296,059 | 1/1967 | Schwindt ...................... 428/184 X |
| 3,640,831 | 2/1972 | Gardner et al. ................. 428/252 X |
| 3,930,658 | 1/1976 | Howe et al. ......................... 280/610 |
| 4,044,083 | 8/1977 | Howe et al. .................... 280/610 X |
| 4,428,993 | 1/1984 | Kohn et al. ..................... 428/464 X |

FOREIGN PATENT DOCUMENTS

| 215868 | 11/1960 | Austria . |
| 231323 | 1/1964 | Austria ................ 280/610 |
| 248306 | 7/1966 | Austria . |
| 258770 | 12/1967 | Austria . |
| 293240 | 9/1971 | Austria . |
| 2444905 | 4/1975 | Fed. Rep. of Germany . |
| 2150511 | 4/1973 | France ................ 428/184 |
| 607490 | 8/1960 | Italy ................ 280/610 |
| 12888 | of 1904 | United Kingdom ............... 428/184 |
| 613529 | 11/1948 | United Kingdom . |
| 675790 | 7/1952 | United Kingdom ............... 428/184 |
| 1371451 | 10/1974 | United Kingdom . |
| 1387692 | 3/1975 | United Kingdom . |

Primary Examiner—Nancy Swisher
Attorney, Agent, or Firm—Fleit, Jacobson, Cohn & Price

[57] ABSTRACT

A lightweight construction core having a cellular structure, whereby the cells are enclosed by walls formed from impregnated paper-like material. The core has the form of a plate with cavities or spaces provided therein and is inserted into a component in such a way that the loading of the component acts as pressure upon the edges of the walls. When the lightweight construction core is used as a support core for a ski, more particularly for a long-distance ski, the core is covered by a covering layer on its sliding surface and on its upper surface. These covering layers may be adhered to lateral edges of the ski. The cells are formed by sandwiching or layering corrugated strips with support layers disposed therebetween, said support layers also being formed from layers to which the corrugated strips are adhered.

5 Claims, 6 Drawing Figures

LIGHTWEIGHT CORE FOR LAMINATE CONSTRUCTIONS

The invention relates to a lightweight core having a cellular structure for use in laminate constructions wherein the core is to be sandwiched between two outer strength-providing covering layers.

Lightweight components produced by a sandwiching or laminating method are characterized in that a support core formed from lightweight material (according to the latest prior art, formed predominantly from wood or expanded foam materials having a relatively low specific weight and average mechanical properties) is adhered to covering layers formed from highly tensile material (materials whose mechanical properties are at least 10 times greater, and generally 100 times greater, than the properties of the core material) and, as a consequence thereof, such core has a good rigidity or strength to weight ratio.

The covering layers may be metals, whose mechanical properties are independent of direction (even components formed therefrom have properties independent of direction), or may be fibre-reinforced plastics materials having high mechanical properties in the direction of the fibres (even the component formed therefrom has properties dependent on direction).

The purpose of the support cores or core materials is to keep the structure-forming covering layers spaced apart by absorbing pressure forces or by absorbing shearing forces in the adhesion zone.

When high demands are made of a component in respect of component weights or mechanical properties, honeycomb cores are used according to the latest prior art. Such honeycomb cores may be formed from thin foils which are shaped to form a honeycomb structure with the use of adhesives—hexagonal cells being formed in a regular geometric arrangement. Such cores are used in connection with air travel and space travel in the form of fuselage skins, wing skins, rudder surfaces, propulsion units and engine cowlings, doors, hatches, floors and internal structures, but they may also be used as ski cores for skis. A ski is known from Austrian Patent Specification No. 215 868 wherein a core component comprising a honeycomb-structured moulded body formed from metal, more especially lightweight metal, or plastics material, more particularly polyester resin, is provided between an upper strap or covering layer and a lower strap or covering layer. One disadvantage of this honeycomb structure is that the individual foils need to be shaped relatively accurately and, in addition, such a structure is not very strong transversely to the cells.

These honeycomb core structures are disadvantageous because of the high costs involved in the complex manufacturing processes, especially when the honeycomb structures are formed from paper or plastics material foils, and because of the poor elasticity of the structures (in the directions perpendicular to the supporting direction when processing the core materials to form the sandwich components).

Honeycomb cores are quasi isotropic because of the hexagonal outline of the individual honeycombs and can be manufactured with a volumetric weight of up to 40 kg/m$^3$.

The invention seeks to overcome the disadvantages of the expensive honeycomb systems so that the support cores are available at substantially reduced manufacturing costs, due to the easier automatability of the manufacturing process, and/or so that the supporting cores can be considerably better adapted to their intended use due, for example, to their anisotropic properties.

According to the invention, this object is achieved in that, with a lightweight construction core of the above-described type, the core is formed by layering wave formed or corrugated strips with support layers disposed therebetween, similar to such as is known as corrugated cardboard in the packaging material industry. In the present case, however, the cavity axes extend perpendicularly to those surfaces of the support core which are to be adhered to supporting straps or covering layers, so that the paper or other layers are pressure-loaded, as distinct from when such layers are used as packaging material.

Thus according to the present invention there is provided a lightweight core for use in laminated constructions in which constructions the core is sandwiched between two outer strength-providing covering layers, said core comprising a cellular structure having hollow cavities which extend through the core and which cavities have axes extending in the direction of the cavities and perpendicularly to surfaces of the core at the ends of the cavities which are to receive said covering layers, wherein the core is formed by layering corrugated strips with support layers disposed therebetween, wherein the corrugations are adhered at the peaks and troughs thereof to the support layers disposed therebetween, and wherein, in use, the strips and support layers are permanently pressure-loaded.

Prior art does in fact cover the manufacture of compounds formed from corrugated sheets with flat sheets disposed therebetween in the packaging material industry. Appropriate composites are known as corrugated cardboard.

The composites are used in the packaging industry in such a manner that the tangent of the corrugated structure lies adjacent the packaged object and, due to its flexibility, the corrugated structure is therefore used to reduce the stress of impact upon the packaged object. Accordingly, therefore, economical methods are known for the continuous manufacture of appropriate composites.

In contrast to the packaging industry, the composites according to the invention, formed from wave-like or corrugated sheets and flat layers, are loaded in the direction of the cavity axes, and the standing or on-end layers are consequently pressure-loaded.

According to the invention, the individual composites may be combined, inter alia, to form layerings or laminates of any desirable geometry such as, for example, plate-like support cores wherein the individual support core has a multiple thickness to form U-shaped support core sections which may each be cut-up to form the support core thicknesses subsequent to the impregnating and hardening cycles.

Due to the elasticity of the wave or corrugation structure perpendicular to the plane touching the corrugations, and due to an accurate adhesion to the lateral edges of lightweight components, a uniform application of pressure is achieved. When honeycomb structures are used, a uniform application of pressure is not achieved by so-called splicing or joining substances, that is to say synthetic resins, more particularly epoxy resins, which expand to a multiple of their original volume with temperature.

This flexibility may be influenced by the position of the individual corrugation web layers and by the ratio of the free width to the width incorporated in the lightweight component.

The layers extend in a planar manner and contribute towards the stabilization of the support core in its semi-finished state, but they also contribute towards an anisotropic behaviour of the finished component in its adhered state, with high rigidity and strength properties in the direction of the flat layer.

The core material is flexible perpendicular to the layers which extend in a planar manner in the core material plane, so that surfaces of cylinders can be accurately formed in a sandwich construction method when the flat layers in the component point towards the cylinder axis.

The invention will be described further, by way of example, with reference to the accompanying schematic drawings in which.

Figure 1:
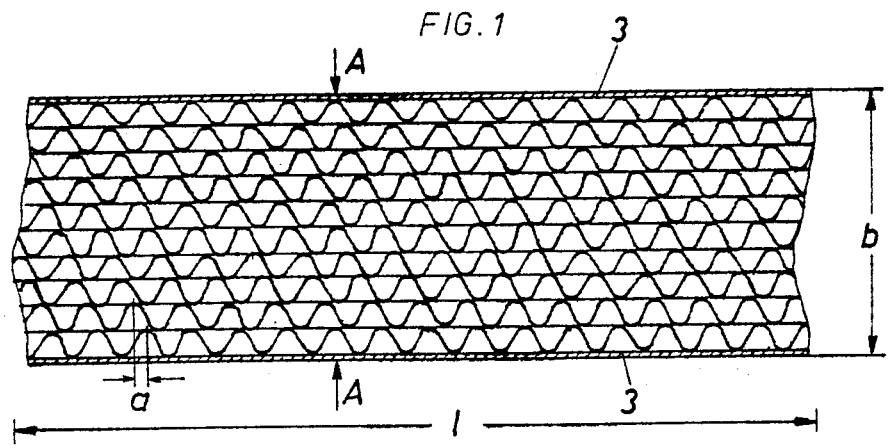
FIG. 1 is a cross-sectional view through a portion of an embodiment of a lightweight construction core on its own without strength-providing sandwiching laminate applied.
Figure 2:
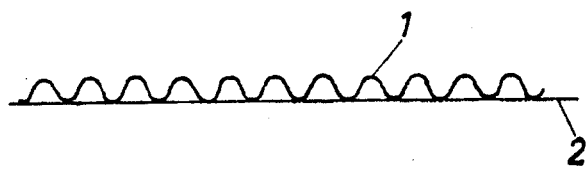
FIG. 2 illustrates one layer of the core of FIG. 1.

A lightweight construction core is shown in FIG. 1 and comprises successive layers each of which, as shown in FIG. 2, comprises a corrugated strip 1 and a support layer 2 which is adhered to the crests or valleys of the corrugations. Any desirable material, for example paper, plastics material or metal, may be used for the corrugated strip 1 and the support layer 2. Paper has proved to be particularly suitable, and any desirable paper may be used which, if need be, is impregnated. However, paper formed from an aromatic polyamide (aramide) has proved to be especially advantageous since it is distinguished by its permanent high temperature resistance, its lack of water absorption and its good mechanical properties as well as its dielectric properties, and more especially by its high tensile strength and low weight.

The corrugated strip 1 is connected to the planar support layer 2 by means of an adhesive, and an epoxy resin or phenolic resin is particularly suitable for this purpose. Above all, epoxy resin is used whenever there is a demand for high strength and easy processability, for example, in the ski-manufacturing industry, and, in turn, phenolic resin is used where there are also special fire regulations, for example, in the aeroplane manufacturing industry.

The components are impregnated with an adhesive resin and thereby combined to form a laminate core as shown in FIG. 1, and are covered by edge-forming strips or plates 3 preferably formed from phenolic resins. The layers shown individually in FIG. 2 are laid above one another, preferably with the planar support layer 2 disposed at the top and, in consequence, the adhesive advantageously flows downwardly at the corrugations and accumulates in the corners of the bottoms of the corrugations, thereby forming a particularly strong connection or bond between the corrugated strip 1 of one layer and the support layer 2 of the layer disposed therebeneath. The adhesive is hardened by the effect of heat in a hot-air container or oven.

If normal paper is used, it has been found impregnated, calandered paper has proved satisfactory but, for cost-saving reasons, this paper is preferably only used for the corrugated strip 1, whilst the support layer 2 may be formed from a less expensive, non-calandered paper.

The individual layers are advantageously so disposed that the waves of the corrugations are offset relative to one another by a distance a, for example by half a modulus, that is to say half the distance between the peak of the crest of the wave and adjacent the bottom of the trough of the wave of a corrugated strip 1, whereby a certain degree of elasticity is achieved in the direction of arrows A. This constitutes one particular advantage of the structure according to the invention of the lightweight construction core since, by selecting the distance a between zero and $\alpha \times a$, or between zero and one modulus, the degree of elasticity can be adjusted as required.

Figure 3:
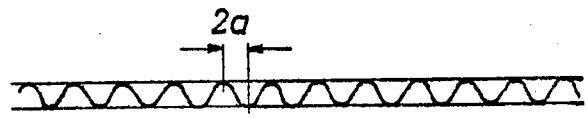
FIG. 3 illustrates one embodiment of an end layer of a core.
Figure 4:
FIG. 4 is a plan view of one embodiment of the lightweight construction core according to the invention with top and bottom sandwiching strips applied to provide strength to the construction and in the form of a ski, more especially a long-distance ski.

A corrugated strip which is covered on both sides as shown in FIG. 3 may be used for the top or bottom layers of the core shown in FIG. 1, so that a support layer 2 is provided between each of the two plates 3 and the respective corrugated strip 1. A flat sheet is preferably used in all cases for the support layer 2.

The lightweight construction support core can therefore be used for all industrial purposes where a maximum utilisation of material is required with little actual weight of the material. In addition, the core is advantageous for the ski manufacturing industry in that the achieved elasticity in the direction of arrows A permits adaptation to the ski shape.

When using the lightweight construction core according to the invention for the manufacture of skis, more particularly long-distance skis, the core is made in the form of plates or blocks in the width of the ski, that is to say the width b of the core corresponds to the width b of the ski. The length "l" of the plates or blocks corresponds to approximately the maximum length l' of the ski to be manufactured. The height of the plates or blocks may be selected as desired. Layers are then cut from this height so as to correspond to the mould of the ski. For example, for the assembly of long-distance skis, the lower strap or covering layer (forming an outer main surface of the ski), the core and the upper strap or covering layer (forming the opposite outer surface of the ski) are inserted into a mould, a resin adhesive is applied, and the components of the ski are adhered together in said mould by the effect of pressure and heat. Since the mould is adapted to the shape of the ski, the core is provided with parallel, lateral walls formed by the strip-like, edge forming plates 3, as can be seen in the plan view in the original form, and the core is adapted to this pre-determined shaped mould as a consequence of its elasticity in the direction of the arrows A, whereby the strip-like edge forming plates 3 form the lateral edge walls of the ski. Naturally, within the scope of the invention, various structural changes may be made and it is considered thus possible to produce the support layer and/or the corrugated strip from a fabric or a metal foil.

Finally, the shape of the corrugations or waves may be bevelled, for example, and be comprised of flat surfaces, or it may be round or oval or may be composed of segments of any desirable form. It is possible, therefore, to form the cross-sections of the corrugations from, for example, successive triangles, rectangles or other polygons.

Figure 5:
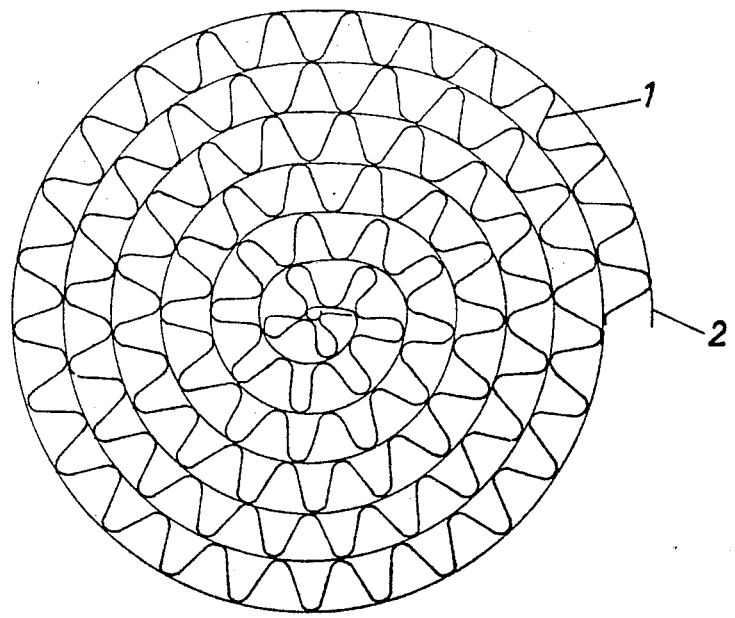
FIGS. 5 and 6 are cross-sectional views illustrating further embodiments of lightweights construction cores.
Figure 6:
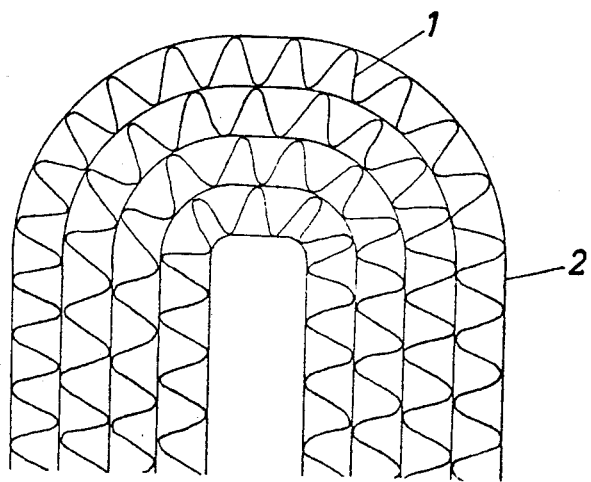

The structure of corrugated strips and layers disposed therebetween may result in layerings of any desirable geometry. An elongate plate-shaped support core has been described above. However, it is also possible, to use, for example, circular sections, sections which are helical in the plane (FIG. 5) or U-shaped sections (FIG. 6).

The support core may be produced as a multiple of the height of the subsequently used support core height and whereby the core is subsequently divided into the appropriate dimensions that is to say the appropriate core heights, by appropriate means such as mechanical cutting means, laser beams or water-jet cutting devices subsequent to manufacture.

In addition, the cross-section may be built-up by sandwiching or layering upright or on-end strips and corrugated strips having different corrugation heights. The variation in the corrugation height alters the density of the upright strips and, in particular, affects the pressure-resistance of the support core, the inherent rigidity of the support core, the adhesion of the cover laminations (the adhesion of the outermost strap or plate components increases with the number of upright strips per unit area), and naturally affects the volumetric weight of the support core.

With impregnated layers or strips, the weight of the impregnation is preferably 0.5 to 10 times the strip weight and is advantageously 0.8 to 4 times the strip weight. The volumetric weight of the lightweight construction core can be set, depending on the desire for mechanical properties, by selecting layers and strips used and by selecting the impregnating resins, as well as the impregnating resin coating.

The layers or strips are generally used with a square meter weight of between 40 grammes and 300 grammes per square meter weight per unit area.

For reasons of combustibility, aromatic polyamide (Aramide) fibre papers are generally impregnated with phenolic resin compositions.

To achieve increased mechanical properties (pressure-resistance), better adhesion and economy, the layers and strips are impregnated with epoxy resins or one-component lacquer systems.

The flexibility of the corrugated strip in the direction of arrow A is determined by the ratio of 2a:b, and the processing of the individual corrugation element to form lightweight construction cores and lightweight components is critical for such purpose.

The underneath or support layers disposed therebetween, more especially the support layers disposed on the outside or ends of the subsequent component, are comprised of compact plastics material plates which serve to protect the structure from mechanical influences or climatic influences. The plastics materials are impact-resistant and lightweight and phenolic resins or ABS is preferably used.

The corrugated layers or strips, which are adhered to support layers in a known process, are impregnated with two-component resin systems or lacquers by impregnation or by various spraying or spreading methods; the layers or strips are then sandwiched in appropriate containers or shape-producing moulds and hardened or dried by supply of heat (generally by hot air, but also by thermal conduction or high-frequency heating in pressure systems), whereby the impregnation of the layers or strips occurs simultaneously with the adhesion of the individual layers.

Supporting straps or strength providing outer covering layers formed from metal- or fibre-reinforced plastics materials, for example, may be adhered under pressure and/or temperature, partially with a simultaneous adhesion to on-end or upright laminations, laterally on the support core. Such laminate components comprise, for example, long-distance skis and alpine skis.

The ratio between the free support core width and the incorporated width determines the pressure on the upright laminations during the pressing operation.

The lightweight construction core according to the invention is also preferably used when optimum thermal insulation is required for highly-resistant, walk-upon floors or walls of cooling containers or for facade elements of buildings in hot regions of the world.

Because of their large ratio of rigidity to weight, such components may be used for containers or parts of containers, for example, in containers for air travel and shipping, or in containers in the motor vehicle construction industry, as well as for fittings such as, for example, floors, wall coverings, ceiling coverings in all kinds of transport.

Some of these components may be used with curves which constitute portions of surfaces and cylinders, to cover vehicle parts or to reduce the aerodynamic resistance, and some of these components may be used with bores provided in the surfaces—such components serving as additional sound insulation means.

We claim:

1. A ski comprising a lower and an upper covering layer defining a longitudinal and a horizontal axis, two parallel lateral walls arranged perpendicular to the lower and upper layers and extending substantially the whole distance of said longitudinal axis, and a core member positioned between said lower and upper covering layers, said core member comprising a plurality of layers of corrugated strips of material having juxtaposed support layers of planar strips adhesively bonded at the apex of each corrugated strip and disposed between adjacent corrugated strips to form a cellular structure, wherein the cellular structure defines a plurality of hollow cavities which extend through the core, the axis of each hollow cavity extending in a direction perpendicular to said longitudinal axis of said ski and to said covering layers, said planar strips permitting the core to be elastically deflected under a pressure that is applied to the core in a direction perpendicular to the longitudinal axis of said ski and along the horizontal axis, the axis of each hollow cavity also extending in parallel relationship to said lateral walls and said lateral walls having edges of the cellular structure adhered thereto, said core extending along a major portion of said longitudinal axis of said ski.

2. The ski as claimed in claim 1, in which the core forms a support core of the ski and the covering layers define a lower sliding surface and an upper surface, to provide strength to the ski said strength-providing layers being adhered to edges of said planar strips.

3. The ski according to claim 1, wherein the ski further comprises lateral walls comprised of strip-like edge forming plates provided along outer edges of the core.

4. The ski according to claim 1, wherein said covering layers are comprised of compact plastics material plates.

5. The ski according to claim 3, wherein said edge forming plates are comprised of compact plastics material plates.

* * * * *